United States Patent [19]

Nakamura

[11] 4,294,487
[45] Oct. 13, 1981

[54] CAR BODY

[75] Inventor: Yoshiharu Nakamura, Koganei, Japan

[73] Assignee: Nissan Motor Company, Limited, Kanagawa, Japan

[21] Appl. No.: 68,002

[22] Filed: Aug. 20, 1979

[30] Foreign Application Priority Data

Sep. 12, 1978 [JP] Japan .................. 53-125960[U]

[51] Int. Cl.³ .................................. B62D 25/04
[52] U.S. Cl. ................................. 296/188; 296/195
[58] Field of Search ............... 296/195, 193, 202, 187, 296/188

[56] References Cited

U.S. PATENT DOCUMENTS

| 1,825,275 | 9/1931 | Ledwinka | 296/202 |
| 2,271,649 | 2/1942 | Komenda | 296/193 |
| 3,591,231 | 7/1971 | Nessells | 296/188 |
| 3,776,589 | 12/1973 | Barenyl | 296/187 |

FOREIGN PATENT DOCUMENTS

| 1806402 | 6/1969 | Fed. Rep. of Germany . |
| 1808786 | 4/1970 | Fed. Rep. of Germany . |
| 409851 | 1/1939 | United Kingdom . |

Primary Examiner—Robert R. Song
Attorney, Agent, or Firm—Schwartz, Jeffery, Schwaab, Mack, Blumenthal & Koch

[57] ABSTRACT

Disclosed is a car body of a two-door type including a center pillar provided on each side portion of the car body, a rear fender integrated with the bottom of the center pillar, a rear side glass elevatably provided along the center pillar, and a stiffener having a front wall, a side wall and a rear wall which are formed to have a channel shape in cross-section so as to fit on the inner surface of the center pillar. The stiffener is tightly arranged within the center pillar. The stiffener extends downwardly beyond the waist line of the rear fender. The rear wall of the stiffener is fixed through a flange formed at an edge of the stiffener to an inner panel of the bar body.

3 Claims, 6 Drawing Figures

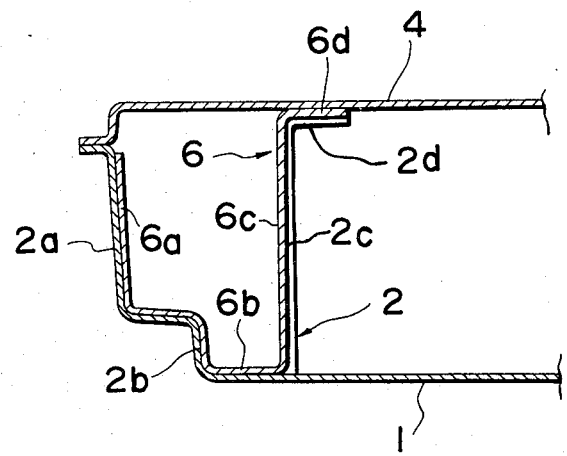
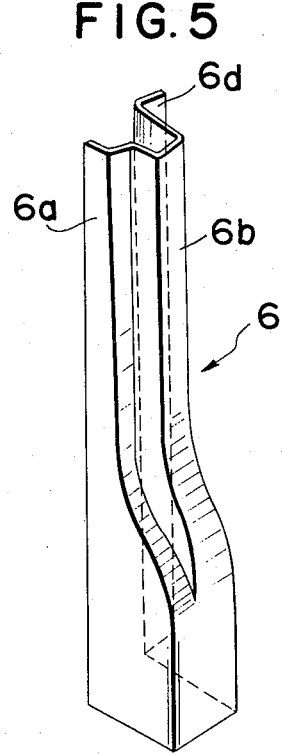
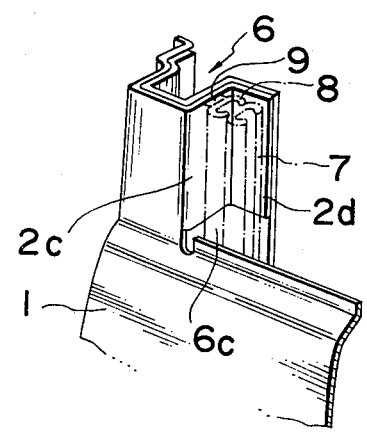

CAR BODY

BACKGROUND OF THE INVENTION

This invention relates to a car body structure, and more particularly relates to a reinforcing structure for a center pillar portion of a two-door type car with a rear side glass operable to be lowered or raised.

In a conventional two-door type automobile or car with an elevating type rear side glass, a center pillar 2 is integrated with a rear fender 1 as shown in FIG. 2. The back wall 2c of the center pillar 2 facing the front edge of a rear side glass 3 has to be made discontinuous to the rear fender 1 at the fender's waist line W, because the wall 2c must allow the glass 3 to enter and go out, differently from the case wherein the rear side glass 3 is fitted in said wall. As shown in FIG. 3, the center pillar 2 is joined with an inner panel 4 of the car body, and is reinforced by the closed cross-sectional structure formed by the joining. As mentioned before, however, because the back wall 2c of the center pillar 2 is discontinuous with the rear fender 1 at the waist line W, the discontinuous portion often has insufficient strength. Particularly because a belt anchor for a seat belt (not shown) is attached to the upper side portion of the center pillar 2, the discontinuous portion is apt to be deformed under the load exerted through the belt anchor.

The reinforcement of this center pillar 2 has not been completely neglected, but the only reinforcement attempted in the past has been the joining of a stiffener 5 with the center pillar 2, over the front wall 2a to the side wall 2b as shown in FIG. 3. Furthermore, the stiffener 5 is attached only to the center pillar 2, but is never extended to below the waist line W of the rear fender 1, and therefore is useless as the reinforcement of the discontinuous portion.

SUMMARY OF THE INVENTION

It is therefore an object of the present invention to provide a car body of two-door type in which a discontinuous portion between a rear fender and a center pillar may be reinforced.

According to the present invention, a stiffener to be joined with an inner side of a center pillar portion is formed from its front wall, side wall and back wall to have a channel-shaped cross-section. Such a stiffener is extended to below the waist line of a rear fender. The back wall of this stiffener is fixed to the inner panel of the car body.

BRIEF DESCRIPTION OF THE DRAWINGS

Other objects, features and advantages of the invention will become more apparent from the following description when read in connection with the accompanying drawings in which:

FIG. 4 is a sectional view taken along line IV—IV in FIG. 1, showing a car body structure according to the present invention;

FIG. 5 is a perspective view of a stiffener utilized in the structure as shown in FIG. 4; and FIG. 6 illustrates a mode of connecting the stiffener with a rear fender, corresponding to that in FIG. 2.

DETAILED DESCRIPTION OF THE PREFERRED EMBODIMENT

Figure 1:
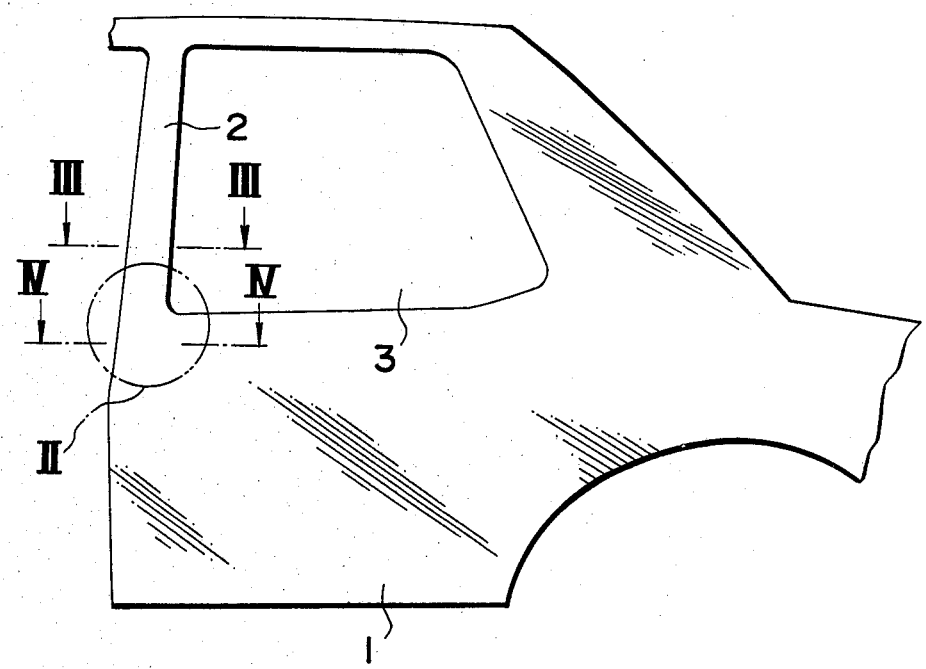
FIG. 1 is a side view illustrating the rear portion a two-door type of a car body having a rear fender.
Figure 2:
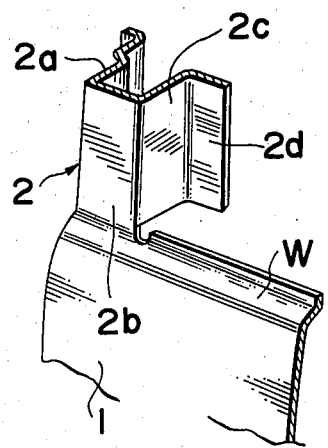
FIG. 2 is a perspective view of the portion II encircled in FIG. 1, showing a prior art structure.
Figure 3:
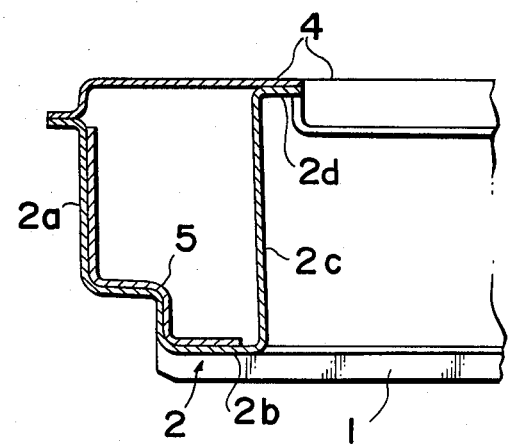
FIG. 3 is a sectional view taken along line III—III in FIG. 1, showing the prior art structure.

Referring to FIGS. 4, 5 and 6, a front wall 6a, a side wall 6b and back or rear wall 6c of a stiffener 6 are so arranged as to form a channel shape in cross section. The stiffener 6 coincides with the inside configuration of a center pillar 2. Such a stiffener 6 is joined with the inside of the center pillar 2. Consequently the center pillar is given a double-layered structure with the stiffener 6. The stiffener 6 is extended to below the waist line W of a rear fender 1. A joining flange 6d is formed with a bending on the side edge of the back wall 6c of the stiffener 6. The flange 6d is joined with the inner panel 4 of a car body by such means as welding. The flange 6d is also joined with the inner panel 4 of the car body as superposed on a flange 2d formed on the back wall 2c of the center pillar 2. As illustrated in FIG. 6, a weather strip 7 is retained within a retainer 8 which is fixed through a seal material 9 to the car body in a conventional manner.

According to the present invention, as above-mentioned, the back wall 6c of the stiffener 6 is superposed on the inside of the back wall 2c of the center pillar 2 to form a double-layered wall structure. The stiffener 6 also extends to below the waist line W of the rear fender 1. In addition, the back wall 6c of the stiffener 6 is fixed to the inner panel 4 of the car body through the flange 6d. Accordingly, the load working through a belt anchor (not shown) fixed on an upper part of the center pillar 2 can be borne by both the rear fender 1 and the inner panel 4 of the car body through the stiffener 6. Thus the center pillar 2 as well as the discontinuous portion of the rear wall 2c thereof can be entirely strengthened.

Also, the back wall 2c of the center pillar and the rear wall 6c of the stiffener 6 form substantially a continuous plane, and the seal material 9 extends to below the waist line W. Therefore, such a structure can prevent dust and the like from entering through the adjoining portion of the waist weather strip (not shown) with the weather strip 7 on the center pillar 2 into car body.

While the present invention has been particularly shown and described with reference to the preferred embodiment of the present invention, other changes and details can be made by those skilled in the art without departing from the sprit and scope of the present invention.

What is claimed is:

1. A car body of two-door type comprising:
   a center pillar provided on each side portion of the car body;
   a rear fender integrated with the bottom of said center pillar;
   a rear side glass elevatably provided along said center pillar; and
   a stiffener having a front wall, a side wall and a rear wall which are formed of a channel shape in cross section so as to fit on the inside of said center pillar, said stiffener being arranged within said center pillar, said stiffener extending downwards beyond the waist line of said rear fender, the rear wall of said stiffener being fixed through a flange formed at an edge of said stiffener to an inner panel of said car body.

2. A car body of claim 1 wherein the back wall of said center pillar and that of said stiffener form a continuous plane, and a seal material extends to below said waist line of said rear fender.

3. A car body of a two-door type comprising:
a center pillar provided on each side portion of the car body;
a rear side panel integrated with the bottom of said center pillar,
a rear side glass elevatably provided along said center pillar; and
a stiffener having a front wall, a side wall and a rear wall which are formed of a channel shape in cross-section so as to fit on the inside of said center pillar, said stiffener being arranged within said center pillar and extending downwardly beyond the waist line of said rear side panel so as to especially reinforce a discontinuous portion between said rear side panel and said center pillar, the rear wall of said stiffener being fixed through a flange formed at an edge of said stiffener to an inner panel of said car body.

* * * * *